US012683433B2

(12) United States Patent　　　(10) Patent No.:　US 12,683,433 B2
Liu　　　　　　　　　　　　　　　　　(45) Date of Patent:　　　Jul. 14, 2026

(54) WIRELESS CHARGING METHOD, TRANSMIT END DEVICE, AND WIRELESS CHARGING DEVICE

(71) Applicant: HUAWEI TECHNOLOGIES CO., LTD., Shenzhen (CN)

(72) Inventor: Yongjun Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1052 days.

(21) Appl. No.: 17/851,787

(22) Filed: Jun. 28, 2022

(65) Prior Publication Data

US 2022/0329104 A1　　Oct. 13, 2022

Related U.S. Application Data

(63) Continuation of application No. PCT/CN2019/130805, filed on Dec. 31, 2019.

(51) Int. Cl.
　　*H02J 50/10*　　　(2016.01)
　　*H02J 50/20*　　　(2016.01)
　　*H02J 50/40*　　　(2016.01)
　　*H02J 50/80*　　　(2016.01)
(52) U.S. Cl.
　　CPC .............. *H02J 50/10* (2016.02); *H02J 50/20* (2016.02); *H02J 50/40* (2016.02); *H02J 50/80* (2016.02)
(58) Field of Classification Search
　　CPC ....................................................... H02J 50/20
　　USPC .......................................................... 320/108
　　See application file for complete search history.

(56) References Cited

U.S. PATENT DOCUMENTS

| | | | |
|---|---|---|---|
| 8,634,928 B1 * | 1/2014 | O'Driscoll | ......... A61N 1/37229 607/33 |
| 10,021,523 B2 * | 7/2018 | Leabman | ................. H04B 5/79 |
| 10,992,189 B2 * | 4/2021 | Wang | ...................... H02J 50/10 |

(Continued)

FOREIGN PATENT DOCUMENTS

| | | |
|---|---|---|
| CN | 105099003 A | 11/2015 |
| CN | 106856346 A | 6/2017 |

(Continued)

OTHER PUBLICATIONS

Xin Wang et al, Wireless Power Delivery to Low-Power Mobile Devices Based on Retro-Reflective Beamforming, IEEE Antenn as and Wireless Propagation Letters, vol. 13, 2014, 4 pages.

*Primary Examiner* — Ahmed H Omar

(57)　　　　　　ABSTRACT

A wireless charging method, a transmit end device (40), and a wireless charging device (10, 20, 30) are provided. A charging process between the transmit end device (40) and the wireless charging device (10, 20, 30) may be a cyclic process. To be specific, the transmit end device (40) sends an electromagnetic wave signal to the wireless charging device (10, 20, 30) for charging. The wireless charging device (10, 20, 30) uses a part of the electromagnetic wave signal for charging, feeds back the other part of the electromagnetic wave signal to the transmit end device (40) for amplification, and then uses an amplified electromagnetic wave signal to charge the wireless charging device (10, 20, 30). In this way, the transmit end device (40) and the wireless charging device (10, 20, 30) can reach a stable power range to perform wireless charging, so that charging performance is improved.

20 Claims, 6 Drawing Sheets

(56)        References Cited

U.S. PATENT DOCUMENTS

| | | | |
|---|---|---|---|
| 2010/0079010 A1* | 4/2010 | Hyde | H02J 50/80 |
| | | | 307/149 |
| 2010/0259447 A1 | 10/2010 | Crouch | |
| 2012/0014274 A1 | 1/2012 | Muraoka et al. | |
| 2013/0214735 A1* | 8/2013 | Kang | H02J 50/12 |
| | | | 320/108 |
| 2017/0288473 A1* | 10/2017 | Choi | H02J 7/04 |
| 2018/0145542 A1* | 5/2018 | Choi | H02J 50/402 |

FOREIGN PATENT DOCUMENTS

| | | | |
|---|---|---|---|
| CN | 106992813 A | 7/2017 |
| CN | 110635582 A | 12/2019 |
| JP | 2014516243 A | 7/2014 |
| JP | 2014212603 A | 11/2014 |
| JP | 2016181953 A | 10/2016 |
| JP | 2018082568 A | 5/2018 |
| JP | 2018129875 A | 8/2018 |
| JP | 2018523453 A | 8/2018 |
| KR | 101914526 B1 | 11/2018 |
| WO | 2010039246 A1 | 4/2010 |
| WO | 2016164785 A1 | 10/2016 |

* cited by examiner

WIRELESS CHARGING METHOD, TRANSMIT END DEVICE, AND WIRELESS CHARGING DEVICE

CROSS-REFERENCE TO RELATED APPLICATIONS

This application is a continuation of International Application No. PCT/CN2019/130805, filed on Dec. 31, 2019, the disclosure of which is hereby incorporated by reference in its entirety.

TECHNICAL FIELD

This disclosure relates to the wireless charging field, and more specifically, to a wireless charging method, a transmit end device, and a wireless charging device.

BACKGROUND

With development of intelligent technologies, a quantity of terminals is increasing. For example, in addition to devices such as a mobile phone, a tablet, a personal computer, a vehicle, and a large screen, there are various small terminals such as a smart home sensor, a home appliance, and a health monitoring device. Because a battery is frequently used, the battery needs to be updated. Therefore, use of a wireless charging technology will become increasingly popular.

In a conventional solution, a transmit end device sends an electromagnetic wave signal, and a wireless charging device may perform charging based on the electromagnetic wave signal. For example, the wireless charging technology is widely applied to near-field wireless charging. However, in far-field wireless charging, due to a location relationship between the transmit end device and the wireless charging device, charging performance of the wireless charging technology is not good. Therefore, with increasing popularity of application of the wireless charging technology, a problem of how to improve charging performance of wireless charging needs to be urgently resolved.

SUMMARY

This disclosure provides a wireless charging method, a transmit end device, and a wireless charging device, to improve charging performance of wireless charging.

According to a first aspect, a wireless charging method is provided. The method includes: A transmit end device receives a first electromagnetic wave signal from a wireless charging device; the transmit end device performs power amplification on all or a part of the first electromagnetic wave signal to obtain a third electromagnetic wave signal; and the transmit end device sends the third electromagnetic wave signal to the wireless charging device, where the third electromagnetic wave signal is used to charge the wireless charging device.

In this embodiment of this disclosure, a charging process between the transmit end device and the wireless charging device may be a cyclic process. To be specific, the transmit end device sends an electromagnetic wave signal to the wireless charging device for charging. The wireless charging device uses a part of the electromagnetic wave signal for charging, feeds back the other part of the electromagnetic wave signal to the transmit end device for amplification, and then uses an amplified electromagnetic wave signal to charge the wireless charging device. In this way, the transmit end device and the wireless charging device can reach a stable power range to perform wireless charging, so that charging performance is improved.

With reference to the first aspect, in some example implementations, that the transmit end device performs power amplification on all or a part of the first electromagnetic wave signal to obtain a third electromagnetic wave signal includes: The transmit end device splits the first electromagnetic wave signal to obtain a second electromagnetic wave signal and a fourth electromagnetic wave signal; the transmit end device determines a gain coefficient based on the fourth electromagnetic wave signal; and the transmit end device performs power amplification on the second electromagnetic wave signal based on the gain coefficient to obtain the third electromagnetic wave signal.

The transmit end device can adjust the gain coefficient based on power of the fourth electromagnetic wave signal. For example, when the power of the fourth electromagnetic wave signal is low (for example, at a low level), the gain coefficient is increased; or when the power of the fourth electromagnetic wave signal is high (for example, at a high level), the gain coefficient is decreased. For example, the transmit end device may set a preset power threshold, and determine a value of a level of the fourth electromagnetic wave signal based on a value relationship between the fourth electromagnetic wave signal and the preset power threshold. In this way, the transmit end device can adjust the power of the third electromagnetic wave signal based on the gain coefficient, so that the power of the third electromagnetic wave signal can reach a stable power range. This helps improve charging performance of wireless charging.

It may be understood that the fourth electromagnetic wave signal may be a part of the first electromagnetic wave signal, and the fourth electromagnetic wave signal is different from the second electromagnetic wave signal. In other words, the first electromagnetic wave signal may be split into the second electromagnetic wave signal and the fourth electromagnetic wave signal. For example, during specific implementation, power or energy allocation may be performed on the first electromagnetic wave signal by using a power divider, or electromagnetic coupling may be performed on power or energy of the first electromagnetic wave signal by using a coupler, to obtain the second electromagnetic wave signal and the fourth electromagnetic wave signal. Energy may be equally or unequally allocated to the second electromagnetic wave signal and the fourth electromagnetic wave signal.

It may also be understood that, in an actual application, the coupler is used to perform electromagnetic coupling on the power or the energy of the first electromagnetic wave signal to obtain the second electromagnetic wave signal and the fourth electromagnetic wave signal. In addition, the energy of the fourth electromagnetic wave signal is generally less than the energy of the second electromagnetic wave signal.

With reference to the first aspect, in some example implementations, the method further includes: The transmit end device receives a fifth electromagnetic wave signal from the wireless charging device, where the fifth electromagnetic wave signal is obtained by the wireless charging device by splitting the third electromagnetic wave signal; and the transmit end device stops charging the wireless charging device when signal strength of the fifth electromagnetic wave signal is less than or equal to a preset value.

The transmit end device may determine, based on a value relationship between the signal strength of the fifth electromagnetic wave signal and a first preset signal strength threshold, whether to continue charging the wireless charging device. Alternatively, the transmit end device may determine, based on a value relationship between a second preset signal strength threshold and a difference between signal strength of a currently received electromagnetic wave signal and signal strength of a previous electromagnetic wave signal, whether to continue charging the wireless charging device. When shielding reaches a specific extent, radiation pollution of electromagnetic wave signals caused by continuous transmission of the electromagnetic wave signals can be avoided. In addition, if an obstacle is a human body, a radiation hazard to the human body can be reduced in this embodiment of this disclosure.

It may be understood that the fifth electromagnetic wave signal is obtained by splitting the third electromagnetic wave.

With reference to the first aspect, in some example implementations, the method further includes: The transmit end device receives a charging connection request from the wireless charging device, where the charging connection request includes charging power requirement information of the wireless charging device; the transmit end device determines, based on the charging power requirement information, whether the transmit end device is capable of charging the wireless charging device; and the transmit end device sends a charging connection response message to the wireless charging device, where the charging connection response message indicates whether the transmit end device is capable of charging the wireless charging device.

The wireless charging device may actively send the charging connection request, where the charging connection request carries the charging power requirement information indicating required power. The transmit end device receives the charging connection request, determines, based on the charging power requirement information in the charging connection request, whether a power requirement can be met, and notifies the wireless charging device of a result by using the charging connection response message. If the transmit end device determines that the transmit end device is capable of charging the wireless charging device, the charging connection response message indicates that the transmit end device is capable of charging the wireless charging device. In this way, the transmit end device can establish a charging connection to the wireless charging device.

With reference to the first aspect, in some example implementations, when the charging connection response message indicates that the transmit end device is incapable of charging the wireless charging device, the charging connection response message further includes delay duration for re-establishing a charging connection.

When the charging connection response message indicates that the transmit end device is incapable of charging the wireless charging device, the charging connection response message further includes the delay duration for re-establishing a charging connection. In this way, when the delay duration expires, the wireless charging device may re-send the charging connection request to the transmit end device. Therefore, power consumption overheads caused by a plurality of requests of the wireless charging device are avoided when the transmit end device cannot provide a charging service.

In some example implementations, before the wireless charging device sends the charging connection request to the transmit end device, the wireless charging device may further receive charging broadcast information from the transmit end device, where the charging broadcast information indicates that the transmit end device has a charging capability.

The charging broadcast information may include an identifier of the wireless charging device. In other words, the transmit end device is configured to trigger the wireless charging device to initiate a charging connection request. In this way, the wireless charging device is prevented from sending a charging connection request to the transmit end device without the charging capability. This helps reduce a charging connection establishment delay.

With reference to the first aspect, in some example implementations, the method further includes: The transmit end device sends the charging broadcast information, where the charging broadcast information includes the charging capability of the transmit end device; and the transmit end device receives a charging connection request from the wireless charging device, where the charging connection request is used to request to charge the wireless charging device.

The transmit end device may actively send the charging broadcast information, and the wireless charging device determines, based on the charging capability included in the received charging broadcast information, whether a power requirement of the wireless charging device can be met. If the charging capability of the transmit end device does not meet the power requirement of the wireless charging device, the wireless charging device may not send the charging connection request to the transmit end device. This reduces power consumption overheads of the wireless charging device.

According to a second aspect, a wireless charging method is provided. The method includes: A wireless charging device receives a third electromagnetic wave signal from a transmit end device; the wireless charging device splits the third electromagnetic wave signal to obtain a fifth electromagnetic wave signal and a sixth electromagnetic wave signal; the wireless charging device sends the fifth electromagnetic wave signal to the transmit end device; and the wireless charging device performs charging based on the sixth electromagnetic wave signal.

In this embodiment of this disclosure, a charging process between the transmit end device and the wireless charging device may be a cyclic process. To be specific, the transmit end device sends an electromagnetic wave signal to the wireless charging device for charging. The wireless charging device uses a part of the electromagnetic wave signal for charging, feeds back the other part of the electromagnetic wave signal to the transmit end device for amplification, and then uses an amplified electromagnetic wave signal to charge the wireless charging device. In this way, the transmit end device and the wireless charging device can reach a stable power range to perform wireless charging, so that charging performance is improved.

It may be understood that the fifth electromagnetic wave signal and the sixth electromagnetic wave may be separately a part of the third electromagnetic wave signal. In other words, the third electromagnetic wave signal may be split into the fifth electromagnetic wave signal and the sixth electromagnetic wave signal. For example, power or energy allocation may be performed on the third electromagnetic wave signal by using a power divider, or electromagnetic coupling may be performed on power or energy of the third electromagnetic wave signal by using a coupler, to obtain the fifth electromagnetic wave signal and the sixth electromagnetic wave signal. Energy may be equally or unequally allocated to the fifth electromagnetic wave signal and the sixth electromagnetic wave signal.

It may also be understood that, in an actual application, the coupler is used to perform electromagnetic coupling on the power or the energy of the third electromagnetic wave signal to obtain the fifth electromagnetic wave signal and the sixth electromagnetic wave signal. In addition, the energy of the fifth electromagnetic wave signal is generally less than the energy of the sixth electromagnetic wave signal.

With reference to the second aspect, in some example implementations, the method further includes: The wireless charging device sends a charging connection request to the transmit end device, where the charging connection request includes charging power requirement information of the wireless charging device; and the wireless charging device receives a charging connection response message from the transmit end device, where the charging connection response message indicates whether the transmit end device is capable of charging the wireless charging device.

The wireless charging device may actively send the charging connection request, where the charging connection request carries the charging power requirement information indicating required power. The transmit end device receives the charging connection request, determines, based on the charging power requirement information in the charging connection request, whether a power requirement can be met, and notifies the wireless charging device of a result by using the charging connection response message. If the transmit end device determines that the transmit end device is capable of charging the wireless charging device, the charging connection response message indicates that the transmit end device is capable of charging the wireless charging device. In this way, the transmit end device can establish a charging connection to the wireless charging device.

With reference to the second aspect, in some example implementations, when the charging connection response message indicates that the transmit end device is incapable of charging the wireless charging device, the charging connection response message further includes delay duration for re-establishing a charging connection. The method further includes: The wireless charging device re-sends the charging connection request to the transmit end device when the delay duration expires.

When the charging connection response message indicates that the transmit end device is incapable of charging the wireless charging device, the charging connection response message further includes the delay duration for re-establishing a charging connection. In this way, when the delay duration expires, the wireless charging device may re-send the charging connection request to the transmit end device. Therefore, power consumption overheads caused by a plurality of requests of the wireless charging device are avoided when the transmit end device cannot provide a charging service.

With reference to the second aspect, in some example implementations, the method further includes: The wireless charging device receives charging broadcast information, where the charging broadcast information includes a charging capability of the transmit end device; and when the charging capability of the transmit end device meets a power requirement of the wireless charging device, the wireless charging device sends a charging connection request to the transmit end device, where the charging connection request is used to request to charge the wireless charging device.

The transmit end device may actively send the charging broadcast information, and the wireless charging device determines, based on the charging capability included in the received charging broadcast information, whether the power requirement of the wireless charging device can be met. If the charging capability of the transmit end device does not meet the power requirement of the wireless charging device, the wireless charging device may not send the charging connection request to the transmit end device. This reduces power consumption overheads of the wireless charging device.

According to a third aspect, a transmit end device for wireless charging is provided. The transmit end device for wireless charging includes: a transceiver antenna, configured to receive a first electromagnetic wave signal from a wireless charging device, and forward all or a part of the first electromagnetic wave signal to a power amplification module; and the power amplification module, configured to perform power amplification on all or the part of the first electromagnetic wave signal to obtain a third electromagnetic wave signal, and send the third electromagnetic wave signal to the transceiver antenna. The transceiver antenna is further configured to send the third electromagnetic wave signal to the wireless charging device, where the third electromagnetic wave signal is used to charge the wireless charging device.

In this embodiment of this disclosure, a charging process between the transmit end device and the wireless charging device may be a cyclic process. To be specific, the transmit end device sends an electromagnetic wave signal to the wireless charging device for charging. The wireless charging device uses a part of the electromagnetic wave signal for charging, feeds back the other part of the electromagnetic wave signal to the transmit end device for amplification, and then uses an amplified electromagnetic wave signal to charge the wireless charging device. In this way, the transmit end device and the wireless charging device can reach a stable power range to perform wireless charging, so that charging performance is improved.

With reference to the third aspect, in some example implementations, the transmit end device further includes a power allocation module and a gain control module. The power allocation module is configured to split the first electromagnetic wave signal to obtain a second electromagnetic wave signal and a fourth electromagnetic wave signal, and send the fourth electromagnetic wave signal to the gain control module. The gain control module is configured to determine a gain coefficient based on the fourth electromagnetic wave signal, and send the gain coefficient to the power amplification module. That the power amplification module is configured to perform power amplification on all or the part of the first electromagnetic wave signal to obtain a third electromagnetic wave signal, and send the third electromagnetic wave signal to the transceiver antenna is specifically: The power amplification module is configured to perform power amplification on the second electromagnetic wave signal based on the gain coefficient to obtain the third electromagnetic wave signal, and send the third electromagnetic wave signal to the transceiver antenna.

The transmit end device can adjust the gain coefficient based on power of the fourth electromagnetic wave signal. For example, when the power of the fourth electromagnetic wave signal is low (for example, at a low level), the gain coefficient is increased; or when the power of the fourth electromagnetic wave signal is high (for example, at a high level), the gain coefficient is decreased. For example, the transmit end device may set a preset power threshold, and determine a value of a level of the fourth electromagnetic wave signal based on a value relationship between the fourth electromagnetic wave signal and the preset power threshold. In this way, the transmit end device can adjust the power of the third electromagnetic wave signal based on the gain coefficient, so that the power of the third electromagnetic wave signal can reach a stable power range. This helps improve charging performance of wireless charging.

It may be understood that the fourth electromagnetic wave signal may be a part of the first electromagnetic wave signal, and the fourth electromagnetic wave signal is different from the second electromagnetic wave signal. In other words, the first electromagnetic wave signal may be split into the second electromagnetic wave signal and the fourth electromagnetic wave signal. For example, power or energy allocation may be performed on the first electromagnetic wave signal by using a power divider, or electromagnetic coupling may be performed on power or energy of the first electromagnetic wave signal by using a coupler, to obtain the second electromagnetic wave signal and the fourth electromagnetic wave signal. Energy may be equally or unequally allocated to the second electromagnetic wave signal and the fourth electromagnetic wave signal.

It may also be understood that, in an actual application, the coupler is used to perform electromagnetic coupling on the power or the energy of the first electromagnetic wave signal to obtain the second electromagnetic wave signal and the fourth electromagnetic wave signal. In addition, the energy of the fourth electromagnetic wave signal is generally less than the energy of the second electromagnetic wave signal.

With reference to the third aspect, in some example implementations, the transceiver antenna is further configured to receive a fifth electromagnetic wave signal from the wireless charging device, where the fifth electromagnetic wave signal is obtained by the wireless charging device by splitting the third electromagnetic wave signal. The transmit end device further includes a processing module, where the processing module is configured to stop charging the wireless charging device when signal strength of the fifth electromagnetic wave signal is less than or equal to a preset value.

The transmit end device may determine, based on a value relationship between the signal strength of the fifth electromagnetic wave signal and a first preset signal strength threshold, whether to continue charging the wireless charging device. Alternatively, the transmit end device may determine, based on a value relationship between a second preset signal strength threshold and a difference between signal strength of a currently received electromagnetic wave signal and signal strength of a previous electromagnetic wave signal, whether to continue charging the wireless charging device. When shielding reaches a specific extent, radiation pollution of electromagnetic wave signals caused by continuous transmission of the electromagnetic wave signals can be avoided. In addition, if an obstacle is a human body, a radiation hazard to the human body can be reduced in this embodiment of this disclosure.

It may be understood that the fifth electromagnetic wave signal is obtained by splitting the third electromagnetic wave.

With reference to the third aspect, in some example implementations, the transceiver antenna is further configured to receive a charging connection request from the wireless charging device, where the charging connection request includes charging power requirement information of the wireless charging device. The transmit end device further includes the processing module, where the processing module is configured to determine, based on the charging power requirement information, whether the transmit end device is capable of charging the wireless charging device. The transceiver antenna is further configured to send a charging connection response message to the wireless charging device, where the charging connection response message indicates whether the transmit end device is capable of charging the wireless charging device.

The wireless charging device may actively send the charging connection request, where the charging connection request carries the charging power requirement information indicating required power. The transmit end device receives the charging connection request, determines, based on the charging power requirement information in the charging connection request, whether a power requirement can be met, and notifies the wireless charging device of a result by using the charging connection response message. If the transmit end device determines that the transmit end device is capable of charging the wireless charging device, the charging connection response message indicates that the transmit end device is capable of charging the wireless charging device. In this way, the transmit end device can establish a charging connection to the wireless charging device.

With reference to the third aspect, in some example implementations, when the charging connection response message indicates that the transmit end device is incapable of charging the wireless charging device, the charging connection response message further includes delay duration for re-establishing a charging connection.

When the charging connection response message indicates that the transmit end device is incapable of charging the wireless charging device, the charging connection response message further includes the delay duration for re-establishing a charging connection. In this way, the wireless charging device may re-send the charging connection request to the transmit end device when the delay duration expires. Therefore, power consumption overheads caused by a plurality of requests of the wireless charging device are avoided when the transmit end device cannot provide a charging service.

With reference to the third aspect, in some example implementations, the transceiver antenna is further configured to send charging broadcast information, where the charging broadcast information includes a charging capability of the transmit end device. The transceiver antenna is further configured to receive a charging connection request from the wireless charging device, where the charging connection request is used to request to charge the wireless charging device.

The transmit end device may actively send the charging broadcast information, and the wireless charging device determines, based on the charging capability included in the received charging broadcast information, whether the power requirement of the wireless charging device can be met. If the charging capability of the transmit end device does not meet the power requirement of the wireless charging device, the wireless charging device may not send the charging connection request to the transmit end device. This reduces power consumption overheads of the wireless charging device.

With reference to the third aspect, in some example implementations, the transceiver antenna includes a Van Atta antenna array.

The transceiver antenna may be implemented by using the Van Atta antenna array. The Van Atta antenna array can implement a phase difference of $-\varphi$ between adjacent antenna array elements, so that reverse signal transmission can be implemented. In this way, transmission performance of an electromagnetic wave signal between the transmit end device and the wireless charging device can be improved, and directionality of energy transmission can be implemented.

With reference to the third aspect, in some example implementations, the transceiver antenna includes a plurality of antenna array elements, and each of the plurality of antenna array elements includes antennas, one or more filters, and one or more frequency mixers.

The transceiver antenna may alternatively be implemented by using a frequency mixing antenna array. In other words, reverse signal transmission is implemented. In this way, transmission performance of an electromagnetic wave signal between the transmit end device and the wireless charging device can be improved, and directionality of energy transmission can be implemented.

With reference to the third aspect, in some example implementations, the power allocation module is set between an antenna feedpoint of the antenna and the frequency mixer.

A connection position between the power allocation module and the transceiver antenna may be set close to a position of the antenna feedpoint of the antenna. In this way, an energy loss can be reduced.

With reference to the third aspect, in some example implementations, when each antenna array element includes an antenna, one filter, and one frequency mixer, a frequency of a first input signal of the frequency mixer is twice a frequency of a second input signal, the second input signal is an output signal obtained after an input signal of the transceiver antenna passes through the antenna, an output signal of the frequency mixer is an input signal of the filter, and a frequency that the filter is configured to filter out is three times the frequency of the second input signal.

The frequency mixing antenna array has specific requirements on the input signal of the frequency mixer and a filtering capability of the filter. For example, when the frequency of the first input signal of the frequency mixer is set to twice the frequency of the second input signal, and the frequency that the filter is configured to filter out is set to three times the frequency of the second input signal, phase inversion can be implemented. In other words, beams for signal transmission are opposite. In this way, transmission performance of an electromagnetic wave signal between the transmit end device and the wireless charging device can be improved, and directionality of energy transmission can be implemented.

With reference to the third aspect, in some example implementations, when each antenna array element includes antennas, two filters, and two frequency mixers, a frequency of a first input signal of a first frequency mixer in the two frequency mixers is a sum of a preset frequency and a frequency of a second input signal, the second input signal is an output signal of the antenna, an output signal of the first frequency mixer is an input signal of a first filter in the two filters, an output signal of the first filter is a third input signal of a second frequency mixer in the two frequency mixers, a frequency of a fourth input signal of the second frequency mixer is a difference between the frequency of the second input signal and the preset frequency, an output signal of the second frequency mixer is an input signal of a second filter in the two filters, a frequency that the first filter is configured to filter out is a sum of the preset frequency and twice the frequency of the second input signal, and a frequency that the second filter is configured to filter out is a difference between the frequency of the second input signal and twice the preset frequency.

The frequency mixing antenna array has specific requirements on an input signal of the frequency mixer and a filtering capability of the filter. For example, each antenna array element may perform two times of frequency mixing. In this way, phase inversion is implemented. In other words, beams for signal transmission are opposite. In this way, transmission performance of an electromagnetic wave signal between the transmit end device and the wireless charging device can be improved, and directionality of energy transmission can be implemented.

With reference to the third aspect, in some example implementations, when each antenna array element includes an antenna, one filter, and one frequency mixer, a frequency of a first input signal of the frequency mixer is twice a sum of a frequency of a second input signal and a preset frequency, the second input signal is an output signal of the antenna, and a frequency that the filter is configured to filter out is a sum of three times the frequency of the second input signal and twice the preset frequency.

The transceiver antenna may be further configured to set a frequency of an output signal to be different from a frequency of an input signal, to avoid interference between uplink and downlink signals.

With reference to the third aspect, in some example implementations, the power amplification module includes one or more power amplifiers.

The power amplification module may be implemented by using the one or more power amplifiers. For example, a plurality of power amplifiers may be connected in series to implement multi-level amplification, so that a larger gain can be provided. Alternatively, a plurality of power amplifiers are connected in parallel, so that linearity can be improved, and gain adjustment in a larger range can be supported.

With reference to the third aspect, in some example implementations, the power allocation module includes the coupler or the power divider.

When the power allocation module is implemented by using the coupler, a wire having an electromagnetic coupling function may be placed near a transmission line, so that a function of allocating power between the main transmission line and the coupling wire line can be implemented.

According to a fourth aspect, a wireless charging device is provided. The wireless charging device includes: a transceiver antenna, configured to receive a third electromagnetic wave signal from a transmit end device, and forward the third electromagnetic wave signal to a power allocation module; the power allocation module, configured to split the third electromagnetic wave signal to obtain a fifth electromagnetic wave signal and a sixth electromagnetic wave signal, forward the fifth electromagnetic wave signal to the transceiver antenna, and forward the sixth electromagnetic wave to a charging module, where the transceiver antenna is further configured to send the fifth electromagnetic wave signal to the transmit end device; and the charging module, configured to perform charging based on the sixth electromagnetic wave signal.

In this embodiment of this disclosure, a charging process between the transmit end device and the wireless charging device may be a cyclic process. To be specific, the transmit end device sends an electromagnetic wave signal to the wireless charging device for charging. The wireless charging device uses a part of the electromagnetic wave signal for charging, feeds back the other part of the electromagnetic wave signal to the transmit end device for amplification, and then uses an amplified electromagnetic wave signal to charge the wireless charging device. In this way, the transmit end device and the wireless charging device can reach a stable power range to perform wireless charging, so that charging performance is improved.

It may be understood that the fifth electromagnetic wave signal and the sixth electromagnetic wave may be separately a part of the third electromagnetic wave signal. In other words, the third electromagnetic wave signal may be split into the fifth electromagnetic wave signal and the sixth electromagnetic wave signal. For example, power or energy allocation may be performed on the third electromagnetic wave signal by using a power divider, or electromagnetic coupling may be performed on power or energy of the third electromagnetic wave signal by using a coupler, to obtain the fifth electromagnetic wave signal and the sixth electromagnetic wave signal. Energy may be equally or unequally allocated to the fifth electromagnetic wave signal and the sixth electromagnetic wave signal.

It may also be understood that, in an actual application, the coupler is used to perform electromagnetic coupling on the power or the energy of the third electromagnetic wave signal to obtain the fifth electromagnetic wave signal and the sixth electromagnetic wave signal. In addition, the energy of the fifth electromagnetic wave signal is generally less than the energy of the sixth electromagnetic wave signal.

With reference to the fourth aspect, in some example implementations, the transceiver antenna is further configured to send a charging connection request to the transmit end device, where the charging connection request includes charging power requirement information of the wireless charging device. The transceiver antenna is further configured to receive a charging connection response message from the transmit end device, where the charging connection response message indicates whether the transmit end device is capable of charging the wireless charging device.

The wireless charging device may actively send the charging connection request, where the charging connection request carries the charging power requirement information indicating required power. The transmit end device receives the charging connection request, determines, based on the charging power requirement information in the charging connection request, whether a power requirement can be met, and notifies the wireless charging device of a result by using the charging connection response message. If the transmit end device determines that the transmit end device is capable of charging the wireless charging device, the charging connection response message indicates that the transmit end device is capable of charging the wireless charging device. In this way, the transmit end device can establish a charging connection to the wireless charging device.

With reference to the fourth aspect, in some example implementations, when the charging connection response message indicates that the transmit end device is incapable of charging the wireless charging device, the charging connection response message further includes delay duration for re-establishing a charging connection. The transceiver antenna is further configured to send the charging connection request to the transmit end device when the delay duration expires.

When the charging connection response message indicates that the transmit end device is incapable of charging the wireless charging device, the charging connection response message further includes the delay duration for re-establishing a charging connection. In this way, when the delay duration expires, the wireless charging device may re-send the charging connection request to the transmit end device. Therefore, power consumption overheads caused by a plurality of requests of the wireless charging device are avoided when the transmit end device cannot provide a charging service.

With reference to the fourth aspect, in some example implementations, the transceiver antenna is further configured to receive charging broadcast information, where the charging broadcast information includes a charging capability of the transmit end device. The transceiver antenna is further configured to: when the charging capability of the transmit end device meets a power requirement of the wireless charging device, send a charging connection request to the transmit end device, where the charging connection request is used to request to charge the wireless charging device.

The transmit end device may actively send the charging broadcast information, and the wireless charging device determines, based on the charging capability included in the received charging broadcast information, whether the power requirement of the wireless charging device can be met. If the charging capability of the transmit end device does not meet the power requirement of the wireless charging device, the wireless charging device may not send the charging connection request to the transmit end device. This reduces power consumption overheads of the wireless charging device.

With reference to the fourth aspect, in some example implementations, the transceiver antenna includes a Van Atta antenna array.

The transceiver antenna may be implemented by using the Van Atta antenna array. The Van Atta antenna array can implement a phase difference of $-\varphi$ between adjacent antenna array elements, so that reverse signal transmission can be implemented. In this way, transmission performance of an electromagnetic wave signal between the transmit end device and the wireless charging device can be improved, and directionality of energy transmission can be implemented.

With reference to the fourth aspect, in some example implementations, the transceiver antenna includes a plurality of antenna array elements, and each of the plurality of antenna array elements includes antennas, one or more filters, and one or more frequency mixers. A frequency mixing antenna array combination includes one or more frequency mixing antenna arrays.

The transceiver antenna may alternatively be implemented by using the frequency mixing antenna array. In other words, reverse signal transmission is implemented. In this way, transmission performance of an electromagnetic wave signal between the transmit end device and the wireless charging device can be improved, and directionality of energy transmission can be implemented.

With reference to the fourth aspect, in some example implementations, the power allocation module is set between an antenna feedpoint of the frequency mixing antenna array combination and the frequency mixer.

A connection position between the power allocation module and the transceiver antenna may be set close to a position of the antenna feedpoint of the antenna. In this way, an energy loss can be reduced.

With reference to the fourth aspect, in some example implementations, when each antenna array element includes an antenna, one filter, and one frequency mixer, a frequency of a first input signal of the frequency mixer is twice a frequency of a second input signal, the second input signal is an output signal obtained after an input signal of the transceiver antenna passes through the antenna, an output signal of the frequency mixer is an input signal of the filter, and a frequency that the filter is configured to filter out is three times the frequency of the second input signal.

The frequency mixing antenna array has specific requirements on an input signal of the frequency mixer and a filtering capability of the filter. For example, when the frequency of the first input signal of the frequency mixer is set to twice the frequency of the second input signal, and the frequency that the filter is configured to filter out is set to three times the frequency of the second input signal, phase inversion can be implemented. In other words, beams for signal transmission are opposite. In this way, transmission performance of an electromagnetic wave signal between the transmit end device and the wireless charging device can be improved, and directionality of energy transmission can be implemented.

With reference to the fourth aspect, in some example implementations, when each antenna array element includes the frequency mixing antenna array combination, two filters, and two frequency mixers, a frequency of a first input signal of a first frequency mixer in the two frequency mixers is a sum of a preset frequency and a frequency of a second input signal, the second input signal is an output signal obtained after an input signal of the transceiver antenna passes through the antenna, an output signal of the first frequency mixer is an input signal of a first filter in the two filters, an output signal of the first filter is a third input signal of a second frequency mixer in the two frequency mixers, a frequency of a fourth input signal of the second frequency mixer is a difference between the frequency of the second input signal and the preset frequency, an output signal of the second frequency mixer is an input signal of a second filter in the two filters, a frequency that the first filter is configured to filter out is a sum of the preset frequency and twice the frequency of the second input signal, and a frequency that the second filter is configured to filter out is a difference between the frequency of the second input signal and twice the preset frequency.

The frequency mixing antenna array has specific requirements on an input signal of the frequency mixer and a filtering capability of the filter. For example, each antenna array element may perform two times of frequency mixing. In this way, phase inversion is implemented. In other words, beams for signal transmission are opposite. In this way, transmission performance of an electromagnetic wave signal between the transmit end device and the wireless charging device can be improved, and directionality of energy transmission can be implemented.

With reference to the fourth aspect, in some example implementations, when each antenna array element includes an antenna, one filter, and one frequency mixer, a frequency of a first input signal of the frequency mixer is twice a sum of a frequency of a second input signal and a preset frequency, the second input signal is an output signal obtained after an input signal of the transceiver antenna passes through the antenna, and a frequency that the filter is configured to filter out is three times a difference between the frequency of the second input signal and twice the preset frequency.

The transceiver antenna may be further configured to set a frequency of an output signal to be different from a frequency of an input signal, to avoid interference between uplink and downlink signals.

With reference to the fourth aspect, in some example implementations, the power allocation module includes the coupler or the power divider.

When the power allocation module is implemented by using the coupler, a wire having an electromagnetic coupling function may be placed near a transmission line, so that a function of allocating power between the main transmission line and the coupling wire line can be implemented.

According to a fifth aspect, a wireless charging system is provided. The wireless charging system includes the transmit end device according to the first aspect and the wireless charging device according to the second aspect.

Based on the foregoing technical solution, a charging process between the transmit end device and the wireless charging device may be a cyclic process in embodiments of this disclosure. To be specific, the transmit end device sends an electromagnetic wave signal to the wireless charging device for charging. The wireless charging device uses a part of the electromagnetic wave signal for charging, feeds back the other part of the electromagnetic wave signal to the transmit end device for amplification, and then uses an amplified electromagnetic wave signal to charge the wireless charging device. In this way, the transmit end device and the wireless charging device can reach a stable power range to perform wireless charging, so that charging performance is improved.

DESCRIPTION OF EMBODIMENTS

The following describes technical solutions of this disclosure with reference to accompanying drawings.

A wireless charging device in embodiments of this disclosure may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal device in the 5G network, a terminal device in a future evolved public land mobile communication network (Public Land Mobile Network, PLMN), or the like. This is not limited in embodiments of this disclosure.

A transmit end device in embodiments of this disclosure may be a device configured to charge a wireless charging device, for example, a wireless power transmitter, a wireless charging board, a mobile power supply, or an in-vehicle device. This is not limited in embodiments of this disclosure.

Figure 1:
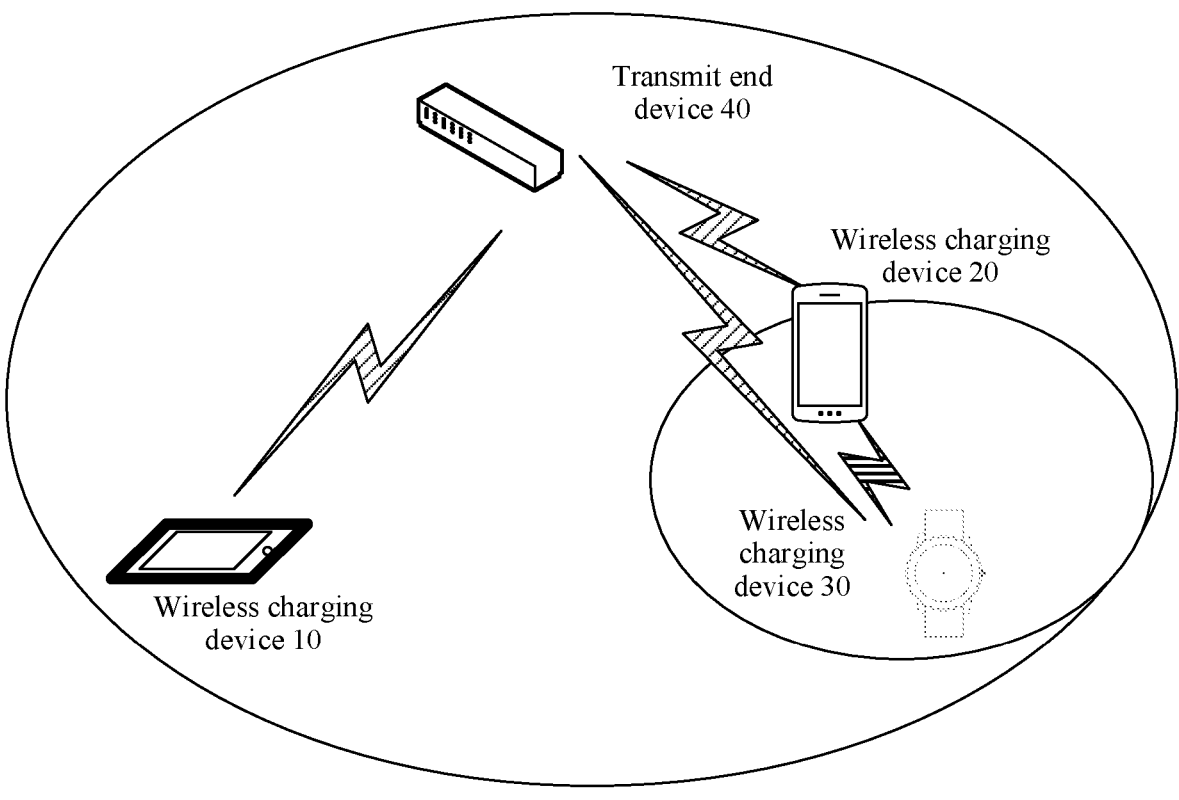
FIG. 1 is a schematic diagram of an application scenario of wireless charging according to this disclosure.

FIG. 1 is a schematic diagram of an application scenario of wireless charging according to this disclosure. The application scenario may include at least one charging device (for example, a wireless charging device 10, a wireless charging device 20, and a wireless charging device 30), and a transmit end device 40. The transmit end device 40 may be configured to send an electromagnetic wave signal, and the wireless charging device may be charged based on the received electromagnetic wave signal. The wireless charging device 10 may be a tablet, the wireless charging device 20 may be a mobile phone, and the wireless charging device 30 may be a wearable device (for example, a watch or an earphone).

In addition, the wireless charging device 20 may also be considered as a transmit end device. In this way, the wireless charging device 20 may also charge the wireless charging device 30.

It should be noted that embodiments of this disclosure may be applied to a wireless charging system including one or more transmit end devices, or may be applied to a communication system including one or more charging devices. This is not limited in this disclosure.

Figure 2:
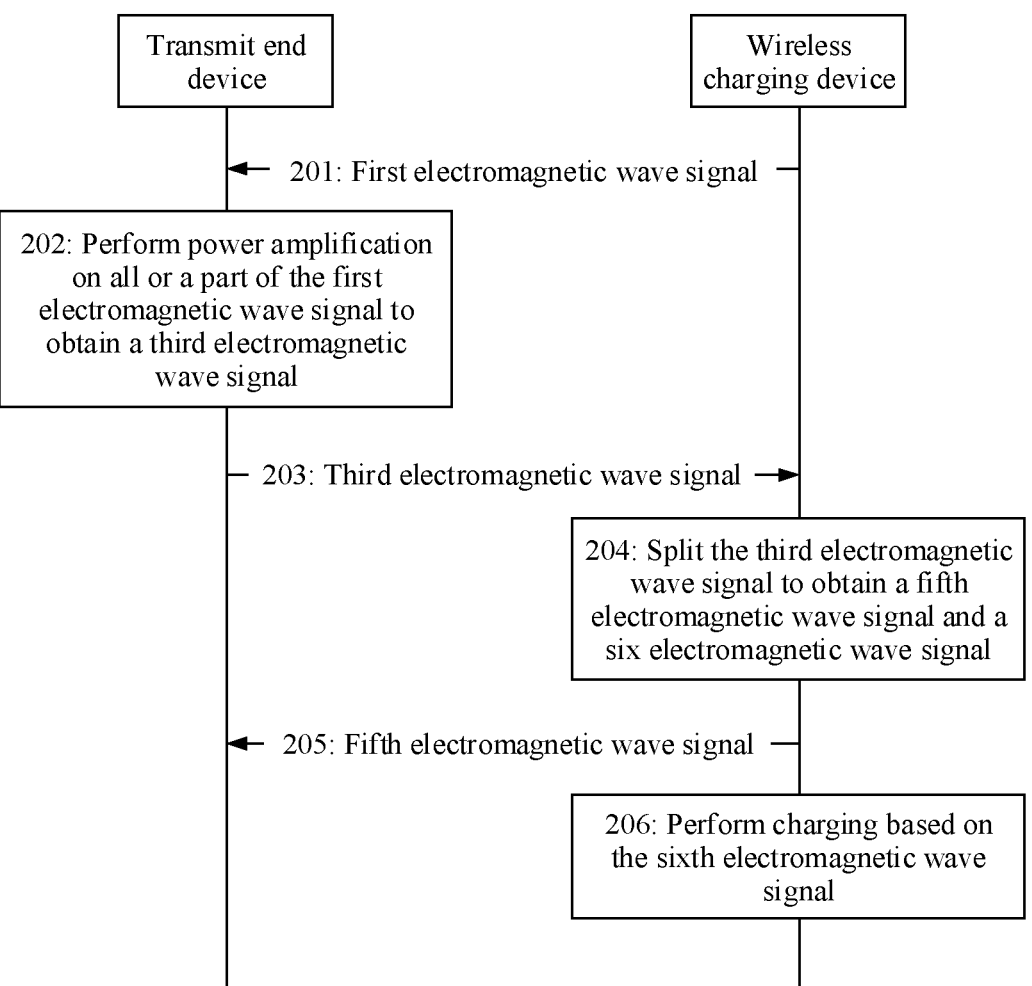
FIG. 2 is a schematic flowchart of a wireless charging method according to an embodiment of this disclosure.

FIG. 2 is a schematic flowchart of a wireless charging method according to an embodiment of this disclosure.

201: A transmit end device receives a first electromagnetic wave signal from a wireless charging device. Correspondingly, the wireless charging device sends the first electromagnetic wave signal to the transmit end device.

202: The transmit end device performs power amplification on all or a part of the first electromagnetic wave signal to obtain a third electromagnetic wave signal.

Specifically, the transmit end device may obtain all or the part (for example, referred to as a second electromagnetic wave signal below) of the first electromagnetic wave signal based on the first electromagnetic wave signal. For example, the second electromagnetic wave signal may be a part of the first electromagnetic wave signal, or the second electromagnetic wave signal is the same as the first electromagnetic wave signal.

It should be noted that a gain coefficient required by the transmit end device to perform power amplification on the first electromagnetic wave signal may be determined based on power of the first electromagnetic wave signal. In other words, the gain coefficient varies with the power of the first electromagnetic wave signal. For example, the gain coefficient decreases as the power of the first electromagnetic wave signal increases, or increases as the power of the first electromagnetic wave signal decreases. Alternatively, the gain coefficient is preset or flexibly changed. This is not limited in this disclosure.

It may be understood that, that the second electromagnetic wave signal is a part of the first electromagnetic wave signal may be understood as that energy of the second electromagnetic wave signal is less than energy of the first electromagnetic wave signal.

Optionally, the transmit end device may further determine the gain coefficient based on a fourth electromagnetic wave signal, where the fourth electromagnetic wave signal is obtained by splitting the first electromagnetic wave signal. In this way, the transmit end device may specifically perform power amplification on the second electromagnetic wave signal based on the gain coefficient to obtain the third electromagnetic wave signal.

Specifically, the transmit end device can adjust the gain coefficient based on power of the fourth electromagnetic wave signal. For example, when the power of the fourth electromagnetic wave signal is low (for example, at a low level), the gain coefficient is increased; or when the power of the fourth electromagnetic wave signal is high (for example, at a high level), the gain coefficient is decreased. For example, the transmit end device may set a preset power threshold, and determine a value of a high level or a low level of the fourth electromagnetic wave signal based on a value relationship between the fourth electromagnetic wave signal and the preset power threshold. In this way, the transmit end device can adjust power of the third electromagnetic wave signal based on the gain coefficient, so that the power of the third electromagnetic wave signal can reach a stable power range. This helps improve charging performance of wireless charging.

It may be understood that the fourth electromagnetic wave signal may be a part of the first electromagnetic wave signal, and the fourth electromagnetic wave signal is different from the second electromagnetic wave signal. In other words, the first electromagnetic wave signal may be split into the second electromagnetic wave signal and the fourth electromagnetic wave signal. Energy allocation of the second electromagnetic wave signal and the fourth electromagnetic wave signal may be equal, or may be unequal. This is not limited in this disclosure. For example, signal energy of the second electromagnetic wave signal may be 80% of signal energy of the first electromagnetic wave signal.

It may also be understood that "split" in "the first electromagnetic wave signal is split into the second electromagnetic wave signal and the fourth electromagnetic wave signal" may also be understood as "break", "decompose", or "extract". For example, power or energy allocation may be performed on the first electromagnetic wave signal by using a power divider, or electromagnetic coupling may be performed on power or energy of the first electromagnetic wave signal by using a coupler, to obtain the second electromagnetic wave signal and the fourth electromagnetic wave signal.

It may also be understood that the other signals may be split from the first electromagnetic wave signal and input to a processing module, and the processing module may perform signal processing, for example, extracting a command or data.

It may also be understood that determining of the high level or the low level of the fourth electromagnetic wave signal may be implemented by using a preset level threshold. For example, when a level of the fourth electromagnetic wave signal is higher than the preset level threshold, the fourth electromagnetic wave signal is at the high level; and when the level of the fourth electromagnetic wave signal is lower than the preset level threshold, the fourth electromagnetic wave signal is a low level. Alternatively, in this embodiment of this disclosure, the transmit end device may set correspondences between a plurality of level intervals and gain coefficients. In this way, the transmit end device may determine a corresponding gain coefficient based on a level interval to which the level of the fourth electromagnetic wave signal belongs.

203: The transmit end device sends the third electromagnetic wave signal to the wireless charging device, where the third electromagnetic wave signal is used to charge the wireless charging device. Correspondingly, the wireless charging device receives the third electromagnetic wave signal sent by the transmit end device.

Optionally, a beam direction of the third electromagnetic wave signal is opposite to a beam direction of the first electromagnetic wave signal.

Specifically, the wireless charging device may send a start signal (for example, the start signal may be the first electromagnetic wave signal) to the transmit end device by using an omnidirectional beam or a wide beam. It is possible that only a start signal using some beams can be received by the transmit end device. Alternatively, the transmit end device sends the start signal by using a full beam or a wide beam, and only a start signal using some beams can be received by the wireless charging device. In this way, the transmit end device and the wireless charging device can find locations of each other. The transmit end device sends the third electromagnetic wave signal to the wireless charging device by using a beam whose direction is opposite to the beam direction of the received first electromagnetic wave signal. In this way, transmission performance of an electromagnetic wave signal between the transmit end device and the wireless charging device can be improved, and directionality of energy transmission can be implemented.

Optionally, a frequency of the third electromagnetic wave signal is different from a frequency of the first electromagnetic wave signal.

Specifically, a frequency at which the transmit end device sends the third electromagnetic wave signal may be different from a frequency at which the transmit end device receives the first electromagnetic wave signal. In this way, transmission interference between uplink and downlink signals can be reduced, and charging performance can be further improved.

204: The wireless charging device splits the third electromagnetic wave signal to obtain a fifth electromagnetic wave signal and a sixth electromagnetic wave signal.

Specifically, the wireless charging device may obtain the fifth electromagnetic wave signal and the sixth electromagnetic wave signal based on the third electromagnetic wave signal. For example, the fifth electromagnetic wave signal and the sixth electromagnetic wave signal may be separately a part of the third electromagnetic wave signal.

It may be understood that, that the fifth electromagnetic wave signal is a part of the third electromagnetic wave signal may be understood as that energy of the fifth electromagnetic wave signal is less than energy of the third electromagnetic wave signal.

It may also be understood that, a manner in which the third electromagnetic wave signal is split to obtain the fifth electromagnetic wave signal and the sixth electromagnetic wave signal may be the same as a manner in which the first electromagnetic wave signal is split to obtain the second electromagnetic wave signal and the fourth electromagnetic wave signal. To avoid repetition, details are not described herein again.

205: The wireless charging device sends the fifth electromagnetic wave signal to the transmit end device. Correspondingly, the transmit end device receives the fifth electromagnetic wave signal from the wireless charging device.

In an embodiment, the transmit end device may further determine, based on signal strength of the fifth electromagnetic wave signal, whether to continue charging the wireless charging device.

Specifically, the transmit end device may determine, based on a value relationship between the signal strength of the fifth electromagnetic wave signal and a first preset signal strength threshold, whether to continue charging the wireless charging device. For example, when the signal strength of the fifth electromagnetic wave signal is less than or equal to the first preset signal strength threshold, the transmit end device stops charging the wireless charging device. When the signal strength of the fifth electromagnetic wave signal is greater than or equal to the first preset signal strength threshold, the transmit end device continues charging the wireless charging device. In other words, the transmit end device may determine, based on the fifth electromagnetic wave signal fed back by the wireless charging device in a wireless charging process, whether there is an obstacle between the transmit end device and the wireless charging device. When shielding reaches a specific extent, radiation pollution of electromagnetic wave signals caused by continuous transmission of the electromagnetic wave signals can be avoided. In addition, if the obstacle is a human body, a radiation hazard to the human body can be reduced in embodiments of this disclosure.

It may be understood that the transmit end device stops charging the wireless charging device. For example, after stopping sending a charging signal (for example, the fifth electromagnetic wave signal) to the wireless charging device, the transmit end device may further re-initiate establishment of a charging connection to the wireless charging device. Alternatively, another transmit end device is searched for charging the wireless charging device. This is not limited in this disclosure.

In another embodiment, the transmit end device may further determine, based on a value relationship between a second preset signal strength threshold and a difference between the signal strength of the fifth electromagnetic wave signal and signal strength of the first electromagnetic wave signal, whether to continue charging the wireless charging device.

Specifically, the transmit end device may determine, based on a value relationship between the second preset signal strength threshold and a difference between signal strength of a currently received electromagnetic wave signal and signal strength of a previous electromagnetic wave signal, whether to continue charging the wireless charging device. For example, when the difference between the signal strength of the fifth electromagnetic wave signal and the signal strength of the first electromagnetic wave signal is less than or equal to the second preset signal strength threshold, the transmit end device stops charging the wireless charging device. When the difference between the signal strength of the fifth electromagnetic wave signal and the signal strength of the first electromagnetic wave signal is greater than the second preset signal strength threshold, the transmit end device continues charging the wireless charging device. In other words, the transmit end device may determine, based on the fifth electromagnetic wave signal and the first electromagnetic wave signal that are fed back by the wireless charging device in the wireless charging process, whether there is the obstacle between the transmit end device and the wireless charging device. When shielding reaches the specific extent, radiation pollution of the electromagnetic wave signals caused by continuous transmission of the electromagnetic wave signals can be avoided. In addition, if the obstacle is the human body, the radiation hazard to the human body can be reduced in embodiments of this disclosure.

It should be noted that the first electromagnetic wave signal may be an electromagnetic wave signal fed back by the wireless charging device to the transmit end device during previous charging.

206: The wireless charging device performs charging based on the sixth electromagnetic wave signal.

Specifically, a charging process between the transmit end device and the wireless charging device may be a cyclic process in embodiments of this disclosure. To be specific, the transmit end device sends an electromagnetic wave signal to the wireless charging device for charging. The wireless charging device uses a part of the electromagnetic wave signal for charging, feeds back the other part of the electromagnetic wave signal to the transmit end device for amplification, and then uses an amplified electromagnetic wave signal to charge the wireless charging device. In this way, the transmit end device and the wireless charging device can reach a stable power range to perform wireless charging, so that charging performance is improved.

In addition, it is assumed that a proportion of the third electromagnetic wave signal in the first electromagnetic wave signal is t, and a power amplification multiple of the transmit end device is A. Because of a path loss between the transmit end device and the wireless charging device, a proportion of a third electromagnetic wave signal arriving at the wireless charging device in the third electromagnetic wave signal transmitted from the transmit end device is $c_1$, a proportion of the fifth electromagnetic wave signal in the received third electromagnetic wave signal is r, and a proportion of a fifth electromagnetic wave signal received by the transmit end device in the fifth electromagnetic wave signal sent by the wireless charging device is $c_2$. Therefore, a gain of a round trip between the transmit end device and the wireless charging device is $Atrc_1c_2$. Therefore, $Atrc_1c_2>1$ can amplify signal power in the round trip. If there is an obstacle between the transmit end device and the wireless charging device, a channel loss significantly increases. In other words, values of $c_1$ and $c_2$ significantly decrease. In other words, in embodiments of this disclosure, when there is the obstacle between the transmit end device and the wireless charging device, the signal power may decrease in the round trip until interruption. In other words, in embodiments of this disclosure, an abnormal event such as shielding can be responded to in time, and signal transmission can be cut off within a time magnitude of ns. In this way, the radiation pollution of the electromagnetic wave signals caused when the wireless charging device transmits the electromagnetic wave signals is avoided. In addition, if the obstacle is the human body, the radiation hazard to the human body can be reduced in embodiments of this disclosure.

It may also be understood that "split" in "the third electromagnetic wave signal is split into the fifth electromagnetic wave signal and the sixth electromagnetic wave signal" may also be understood as "break", "decompose", or "extract". For example, power or energy allocation may be performed on the third electromagnetic wave signal by using a power divider, or electromagnetic coupling may be performed on power or energy of the third electromagnetic wave signal by using a coupler, to obtain the fifth electromagnetic wave signal and the sixth electromagnetic wave signal.

It may also be understood that the other signals may be split from the third electromagnetic wave signal and input to the processing module, and the processing module may perform signal processing, for example, extracting a command or data.

Optionally, when the wireless charging device does not need to continue charging (for example, complete charging), the wireless charging device sends a charging complete indication to the transmit end device.

Specifically, if the transmit end device receives the charging complete indication from the wireless charging device, the transmit end device stops sending the charging signal to the wireless charging device. In this way, radiation pollution caused because the transmit end device still sends the charging signal when the wireless charging device does not need to be charged is avoided.

In an embodiment, before the transmit end device establishes the charging connection to the wireless charging device, for example, before step 201, the wireless charging device may send a charging connection request to the transmit end device, where the charging connection request includes charging power requirement information of the wireless charging device. The transmit end device determines, based on the charging power requirement information, whether the transmit end device is capable of charging the wireless charging device, and indicates, by sending a charging connection response message to the wireless charging device, whether the transmit end device is capable of charging the wireless charging device.

Specifically, the wireless charging device may actively send the charging connection request, where the charging connection request carries the charging power requirement information indicating required power. The transmit end device receives the charging connection request, determines, based on the charging power requirement information in the charging connection request, whether a power requirement can be met, and notifies the wireless charging device of a result by using the charging connection response message. For example, if the transmit end device determines that the transmit end device is incapable of charging the wireless charging device, the charging connection response message indicates that the transmit end device is incapable of charging the wireless charging device. When receiving the charging connection response message indicating that the transmit end device is incapable of charging the wireless charging device, the wireless charging device may further reselect a transmit end device, perform another operation, or the like. If the transmit end device determines that the transmit end device is capable of charging the wireless charging device, the charging connection response message indicates that the transmit end device is capable of charging the wireless charging device. In this way, the transmit end device can establish a charging connection to the wireless charging device.

It may be understood that a phase before the transmit end device establishes the charging connection to the wireless charging device may be referred to a "preparation phase".

Optionally, when the charging connection response message indicates that the transmit end device is incapable of charging the wireless charging device, the charging connection response message further includes delay duration for re-establishing a charging connection. In this way, when the delay duration expires, the wireless charging device may re-send the charging connection request to the transmit end device.

Optionally, before the wireless charging device may send the charging connection request to the transmit end device, the wireless charging device may further receive charging broadcast information from the transmit end device, where the charging broadcast information indicates that the transmit end device has a charging capability.

Specifically, the charging broadcast information may include an identifier of the wireless charging device. In other words, the transmit end device is configured to trigger the wireless charging device to initiate a charging connection request. In this way, the wireless charging device is prevented from sending a charging connection request to a transmit end device without a charging capability. This helps reduce a charging connection establishment delay.

In another embodiment, before the transmit end device establishes the charging connection to the wireless charging device, for example, before step 201, the wireless charging device may further receive the charging broadcast information from the transmit end device, where the charging broadcast information includes the charging capability of the transmit end device. When the charging capability of the transmit end device meets the power requirement of the wireless charging device, the wireless charging device sends the charging connection request to the transmit end device.

Specifically, the transmit end device may actively send the charging broadcast information, and the wireless charging device determines, based on the charging capability included in the received charging broadcast information, whether the power requirement of the wireless charging device can be met. If the charging capability of the transmit end device meets the power requirement of the wireless charging device, the wireless charging device sends the charging connection request to the transmit end device. When receiving the charging connection request, the transmit end device charges the wireless charging device (for example, sends the third electromagnetic wave signal). If the charging capability of the transmit end device does not meet the power requirement of the wireless charging device, the wireless charging device may not send the charging connection request to the transmit end device.

It may be understood that the transmit end device may continuously send the charging broadcast information, or may periodically send the charging broadcast information. This is not limited in this disclosure.

It may be further understood that, at an initial running moment of the communication system, the transmit end device may generate an electromagnetic wave signal, and amplify the electromagnetic wave signal.

Optionally, the charging broadcast information may further include the identifier of the transmit end device.

Embodiments described in this specification may be independent solutions, or may be combined based on internal logic. All these solutions fall within the protection scope of this disclosure.

It may be understood that in the foregoing method embodiment, the method and operations implemented by the transmit end device may alternatively be implemented by a component (for example, a chip or a circuit) that can be used in the transmit end device. The method and the operations implemented by the wireless charging device may also be implemented by a component (for example, a chip or a circuit) that can be used in the wireless charging device.

The foregoing mainly describes the solutions provided in embodiments of this disclosure from a perspective of various interactions. It may be understood that, to implement the foregoing functions, each network element such as the transmit end device or the wireless charging device includes a corresponding hardware structure and/or software module for performing each function. A person skilled in the art should be aware that, in combination with the examples described in embodiments disclosed in this specification, units and algorithm steps may be implemented by hardware or a combination of hardware and computer software in this disclosure. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this disclosure.

In embodiments of this disclosure, the transmit end device or the wireless charging device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this disclosure, division into modules is an example, and is merely logical function division. In actual implementation, another division manner may be used. The following provides description by using an example in which each functional module is obtained through division based on each corresponding function.

It should be understood that the specific examples in embodiments of this disclosure are merely intended to help a person skilled in the art better understand embodiments of this disclosure, but are not intended to limit the scope of embodiments of this disclosure.

It should be understood that sequence numbers of the foregoing processes do not mean execution sequences in embodiments of this disclosure. The execution sequences of the processes should be determined according to functions and internal logic of the processes, and should not be construed as any limitation on the implementation processes of embodiments of this disclosure.

The method provided in embodiments of this disclosure is described above in detail with reference to FIG. 2. The apparatus provided in embodiments of this disclosure is described in detail below with reference to FIG. 3 to FIG. 9. It should be understood that description of apparatus embodiments corresponds to description of the method embodiment. Therefore, for content that is not described in detail, refer to the foregoing method embodiment. For brevity, details are not described herein again.

Figure 3:
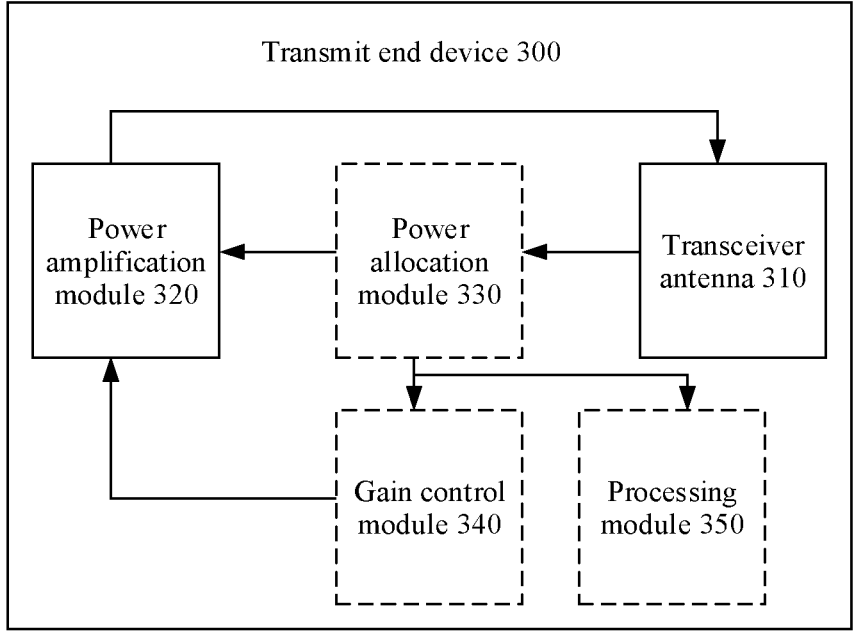
FIG. 3 is a schematic block diagram of a transmit end device for wireless charging according to an embodiment of this disclosure.

FIG. 3 is a schematic block diagram of a transmit end device 300 for wireless charging according to an embodiment of this disclosure.

It should be understood that the transmit end device 300 may correspond to each transmit end device shown in FIG. 1 or a chip in the transmit end device, and the transmit end device in the embodiment shown in FIG. 2 or a chip in the transmit end device. The transmit end device 300 may have any function of the transmit end device in the method embodiment shown in FIG. 2. The transmit end device 300 includes a transceiver antenna 310 and a power amplification module 320.

The transceiver antenna 310 is configured to receive a first electromagnetic wave signal from a wireless charging device, and forward all or a part of the first electromagnetic wave signal to the power amplification module.

The power amplification module 320 is configured to perform power amplification on all or the part of the first electromagnetic wave signal to obtain a third electromagnetic wave signal, and send the third electromagnetic wave signal to the transceiver antenna.

The transceiver antenna 310 is further configured to send the third electromagnetic wave signal to the wireless charging device, where the third electromagnetic wave signal is used to charge the wireless charging device.

It may be understood that the transceiver antenna 310 may be a retrodirective antenna. The retrodirective antenna may be configured to implement that a beam direction of a transmit beam of the third electromagnetic wave signal is opposite to a beam direction of a receive beam of the first electromagnetic wave signal.

Optionally, the transmit end device 300 further includes a power allocation module 330 and a gain control module 340. The power allocation module 330 is configured to split the first electromagnetic wave signal to obtain a second electromagnetic wave signal and a fourth electromagnetic wave signal, and send the fourth electromagnetic wave signal to the gain control module. The gain control module 340 is configured to determine a gain coefficient based on the fourth electromagnetic wave signal, and send the gain coefficient to the power amplification module. That the power amplification module 320 is configured to perform power amplification on all or the part of the first electromagnetic wave signal to obtain a third electromagnetic wave signal, and send the third electromagnetic wave signal to the transceiver antenna is specifically: The power amplification module 320 is configured to perform power amplification on the second electromagnetic wave signal based on the gain coefficient to obtain the third electromagnetic wave signal, and send the third electromagnetic wave signal to the transceiver antenna.

In an example, the power allocation module 330 may be a coupler.

In another example, the power allocation module 330 may be a power divider.

It may be understood that energy of two or more electromagnetic wave signals obtained after the power divider divides an electromagnetic wave signal may be equal. Energy of two or more electromagnetic wave signals obtained after the coupler divides an electromagnetic wave signal is generally unequal. For example, energy of one electromagnetic wave signal in two electromagnetic waves obtained in an electromagnetic coupling manner of the coupler is far less than energy of the other electromagnetic wave signal.

Optionally, the transceiver antenna 310 is further configured to receive a fifth electromagnetic wave signal from the wireless charging device, where the fifth electromagnetic wave signal is obtained by the wireless charging device by splitting the third electromagnetic wave signal. The transmit end device 300 further includes a processing module 350, where the processing module is configured to stop charging the wireless charging device when signal strength of the fifth electromagnetic wave signal is less than or equal to a preset value.

It may be understood that the processing module 350 may be further configured to extract signaling, data, or the like. This is not limited in this disclosure.

Optionally, the transceiver antenna 310 is further configured to receive a charging connection request from the wireless charging device, where the charging connection request includes charging power requirement information of the wireless charging device. The transmit end device 300 further includes the processing module 350, where the processing module 350 is configured to determine, based on the charging power requirement information, whether the transmit end device 300 is capable of charging the wireless charging device. The transceiver antenna 310 is further configured to send a charging connection response message to the wireless charging device, where the charging connection response message indicates whether the transmit end device 300 is capable of charging the wireless charging device.

Optionally, when the charging connection response message indicates that the transmit end device 300 is incapable of charging the wireless charging device, the charging connection response message further includes delay duration for re-establishing a charging connection.

Optionally, the transceiver antenna 310 is further configured to send charging broadcast information, where the charging broadcast information includes a charging capability of the transmit end device. The transceiver antenna 310 is further configured to receive a charging connection request from the wireless charging device, where the charging connection request is used to request to charge the wireless charging device.

In an embodiment, the transceiver antenna includes a Van Atta antenna array.

Figure 4:
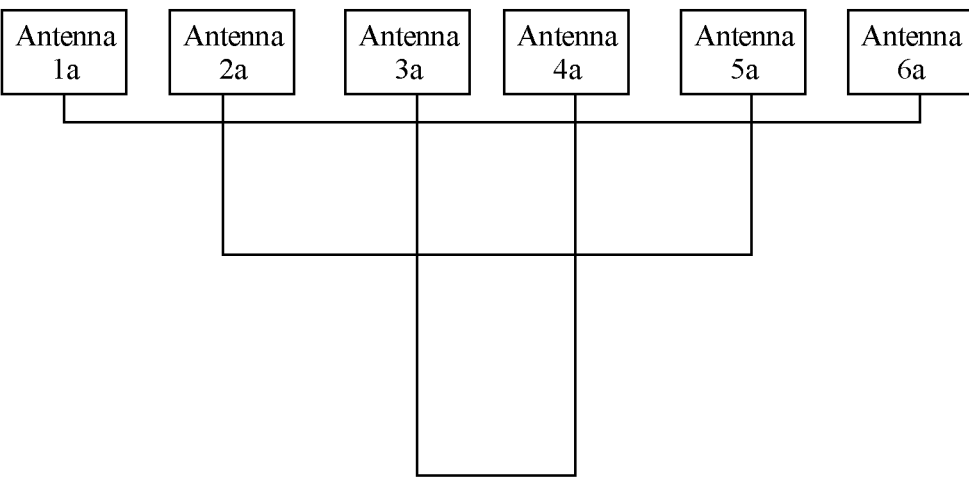
FIG. 4 is a schematic diagram of a Van Atta antenna array according to an embodiment of this disclosure.

Specifically, the transceiver antenna is configured to implement beam inversion of a transmit signal and a receive signal. Beam inversion may also be implemented through phase inversion of the transmit signal and the receive signal. In this way, the transceiver antenna may be the Van Atta antenna array. As shown in FIG. 4, the Van Atta antenna array is generally a linear array, and has an even number of array elements. A same signal connection delay exists between corresponding antenna array elements, and a same delay exists between adjacent antenna array elements. Therefore, a same phase difference $\varphi$ is caused. For example, it is assumed that during receiving, phases of received signals of an antenna 1*a*, an antenna 2*a*, . . . , an antenna N*a*, an antenna N*b*, . . . , an antenna 2*b*, and an antenna 1*b* are $\theta$, $\theta+\varphi$, $\theta+(N-1)\varphi$, $\theta+N\varphi$, . . . , $\theta+(2N-2)\varphi$, and $\theta+(2N-1)\varphi$ respectively, and connection delay phases are all $\alpha$. In this case, during transmitting, phases of transmitted signals of the antenna 1*a*, the antenna 2*a*, . . . , the antenna N*a*, the antenna N*b*, . . . , the antenna 2*b*, and the antenna 1*b* are $\alpha+\theta+(2N-1)\varphi$, $\alpha+\theta+(2N-2)\varphi$, $\alpha+\theta+N\varphi$, $\alpha+\theta+(N-1)\varphi$, . . . , $\alpha+\theta+\varphi$, and $\alpha+\theta$ respectively (for example, the signal transmitted by the antenna 1*a* is the received signal of the antenna 1*b*, and a phase of the signal transmitted by the antenna 1*a* is a phase of the received signal of the antenna 1*b* plus the connection delay phase). In this way, a phase difference between adjacent antenna array elements is $-\varphi$, so that reverse signal transmission is implemented.

In another embodiment, the transceiver antenna includes a plurality of antenna array elements, and each of the plurality of antenna array elements includes antennas, one or more filters, and one or more frequency mixers.

It may be understood that the transceiver antenna is a frequency mixing antenna array.

In an example, each antenna array element includes an antenna, one filter, and one frequency mixer.

Optionally, a frequency of a first input signal of the frequency mixer is twice a frequency of a second input signal, the second input signal is an output signal obtained after an input signal of the transceiver antenna passes through the antenna, an output signal of the frequency mixer is an input signal of the filter, and a frequency that the filter is configured to filter out is three times the frequency of the second input signal.

Figure 5:
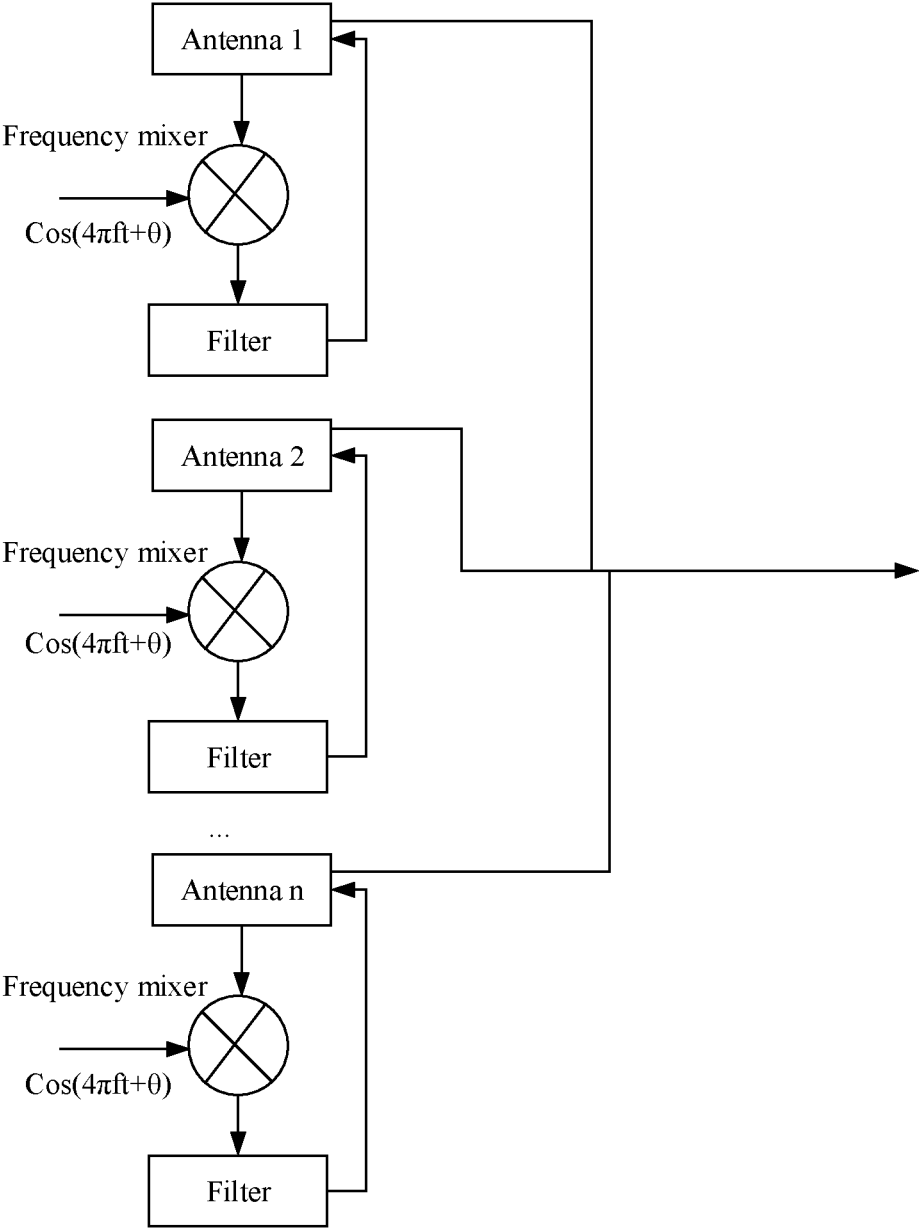
FIG. 5 is a schematic diagram of a frequency mixing antenna array according to an embodiment of this disclosure.

Specifically, as shown in FIG. 5, an input signal of an $i^{th}$ antenna array element in the plurality of antenna array elements is $\cos(2\pi ft+\varphi i)$, where i=1, . . . , n. The input signal may be used as the second input signal of the frequency mixer after passing through the antenna. In addition, the frequency mixer further has another input signal (referred to as a first input signal below), and the first input signal may be $\cos(4\pi ft+\theta)$. In this way, a signal output by the frequency mixer after frequency mixing is performed on the first input signal and the second input signal is $0.5\times[\cos(6\pi ft+\theta+\varphi i)+\cos(2\pi ft+\theta-\varphi i)]$. After a component whose frequency is three times a frequency is filtered out through low-pass or band-pass filtering, the signal becomes $0.5\times\cos(2\pi ft+\theta-\varphi i)$. The filter outputs the signal to the antenna for transmission. In this way, phase inversion is implemented, in other words, beams for signal transmission are opposite.

It may be understood that an antenna in the transceiver antenna may send or receive a signal by using one physical unit, or may send or receive a signal by using two physical units respectively.

In another example, each antenna array element includes antennas, a plurality of filters, and a plurality of frequency mixers.

Optionally, when the transceiver antenna includes antennas, two filters, and two frequency mixers, a frequency of a first input signal of a first frequency mixer in the two frequency mixers is a sum of a preset frequency and a frequency of a second input signal, the second input signal is an output signal obtained after an input signal of the transceiver antenna passes through the antenna, an output signal of the first frequency mixer is an input signal of a first filter in the two filters, an output signal of the first filter is a third input signal of a second frequency mixer in the two frequency mixers, a frequency of a fourth input signal of the second frequency mixer is a difference between the frequency of the second input signal and the preset frequency, an output signal of the second frequency mixer is an input signal of a second filter in the two filters, a frequency that the first filter is configured to filter out is a sum of the preset frequency and twice the frequency of the second input signal, and a frequency that the second filter is configured to filter out is a difference between the frequency of the second input signal and twice the preset frequency.

Figure 6:
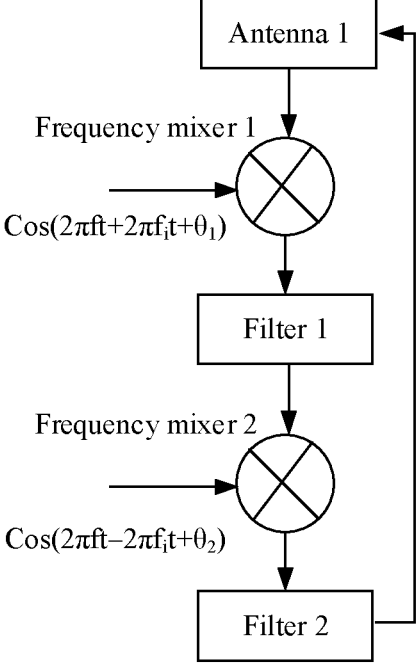
FIG. 6 is a schematic diagram of another frequency mixing antenna array according to an embodiment of this disclosure.

Specifically, each antenna array element may alternatively perform two times of frequency mixing. For example, as shown in FIG. 6, an antenna array element is used as an example for description. A second input signal of a frequency mixer 1 is $\cos(2\pi ft+\varphi i)$, and a first input signal is $\cos(2\pi ft+2\pi f_i t+\theta_1)$, where $i=1, \ldots, n$. A signal obtained after frequency mixing is performed on the first input signal and the second input signal is $0.5\times[\cos(4\pi ft+2\pi f_i t+\theta_1+\varphi i)+\cos(2\pi f_i t+\theta_1-\varphi i)]$. After a frequency component of $(2f+f_i)$ is filtered out by the filter 1, the signal becomes $0.5\times\cos(2\pi f_i t+\theta_1-\varphi i)$. The signal $0.5\times\cos(2\pi f_i t+\theta_1-\varphi i)$ passes through a frequency mixer 2, and another input signal of the frequency mixer 2 is $\cos(2\pi ft-2\pi f_i t+\theta_2)$. In this way, a signal $0.25\times[\cos(2\pi ft+\theta_1+\theta_2-\varphi i)+\cos(2\pi ft-4\pi f_i t-\theta_1+\theta_2+\varphi i)]$ is obtained after frequency mixing is performed by the frequency mixer 2 on the two signals. An output signal of the frequency mixer 2 passes through the filter 2. After a frequency component $(f-2f_i)$ is filtered out, the signal becomes $0.25\times\cos(2\pi ft+\theta_1+\theta_2-\varphi i)$. In this way, phase inversion is implemented, and reverse signal transmission is implemented.

It may be understood that a value of $f_i$ may be less than f. This can help reduce difficulty in generating the first input signal.

Optionally, when the transceiver antenna includes an antenna, one filter, and one frequency mixer, a frequency of a first input signal of the frequency mixer is twice a sum of a frequency of a second input signal and a preset frequency, the second input signal is an output signal obtained after an input signal of the transceiver antenna passes through the antenna, and a frequency that the filter is configured to filter out is a sum of three times the frequency of the second input signal and twice the preset frequency.

Figure 7:
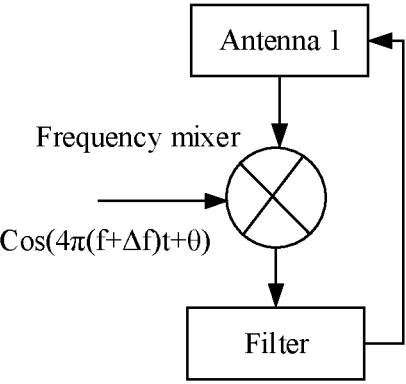
FIG. 7 is a schematic diagram of still another frequency mixing antenna array according to an embodiment of this disclosure.

Specifically, the transceiver antenna may be further configured to set a frequency of an output signal to be different from a frequency of an input signal, to avoid interference between uplink and downlink signals. For example, as shown in FIG. 7, an $i^{th}$ array element in the transceiver antenna is used as an example for description. An input signal of the $i^{th}$ array element is $\cos(2\pi ft+\varphi i)$, where $i=1, \ldots, n$, and the signal is output to a frequency mixer after passing through an antenna. Another input signal of the frequency mixer is $\cos[4\pi(f+\Delta f)t+\theta]$. In this way, $0.5\times[\cos(6\pi ft+4\pi\Delta ft+\varphi i)+\cos(2\pi ft+4\pi\Delta ft+\theta-\varphi i)]$ may be obtained after frequency mixing is performed by the frequency mixer on the two signals. After the filter filters out a component whose frequency is three times a frequency, the signal becomes $0.5\times\cos[2\pi(f+2\Delta f)t+\theta-\varphi i]$. In this way, phase inversion is implemented, and the frequency of the output signal of the transceiver antenna is different from the frequency of the input signal (in other words, $2\Delta f$ is increased).

It should be noted that, in a scenario shown in FIG. 7, the first input signal of the frequency mixer in the transceiver antenna of the wireless charging device may be $\cos[4\pi ft+\theta]$ or $\cos[4\pi(f+\Delta f)t+\theta]$. When the first input signal of the frequency mixer in the transceiver antenna of the wireless charging device may be $\cos[4\pi(f-\Delta f)t+\theta]$, a frequency of $2\Delta f$ is increased for the first input signal of the transmit end device, and the frequency of $2\Delta f$ is decreased for the first input signal of the wireless charging device. If it is considered that a higher frequency can make a size of the antenna array smaller, the transmit end device may use a lower frequency, and the wireless charging device may use a higher frequency, so that the wireless charging device is more compact.

It may be understood that a value of $\Delta f$ may be a positive number, or may be a negative number.

Optionally, the power allocation module 330 is set between an antenna feedpoint of the antenna and the frequency mixer.

Figure 8:
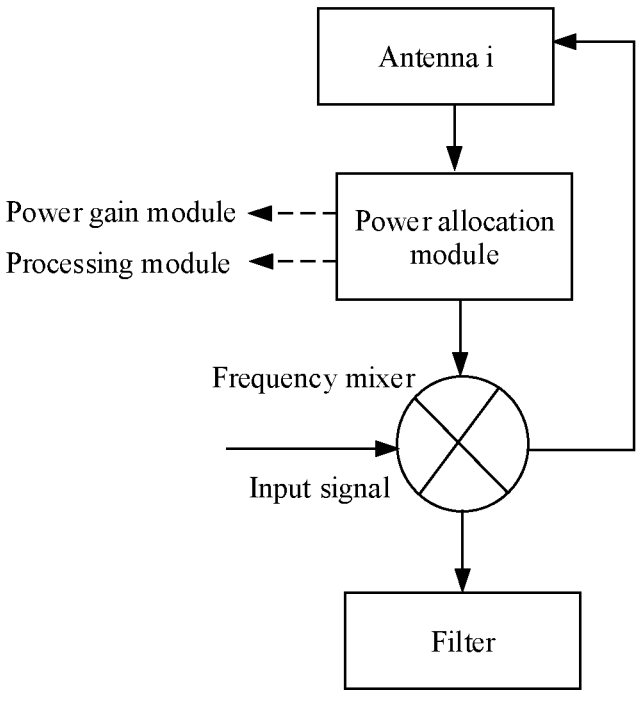
FIG. 8 is a schematic diagram of a connection relationship between a frequency mixing antenna array and a power allocation module according to an embodiment of this disclosure.

Specifically, as shown in FIG. 8, a connection position between the power allocation module and the transceiver antenna may be set close to a position of the antenna feedpoint of the antenna. In this way, an energy loss can be reduced.

Optionally, the power amplification module includes one or more power amplifiers.

Specifically, the power amplification module may be implemented by using the one or more power amplifiers. For example, a plurality of power amplifiers may be connected in series to implement multi-level amplification, so that a larger gain can be provided. Alternatively, a plurality of power amplifiers are connected in parallel, so that linearity can be improved, and gain adjustment in a larger range can be supported.

Optionally, the power allocation module includes a coupler or a power divider.

Specifically, when the power allocation module is implemented by using the coupler, a wire having an electromagnetic coupling function may be placed near a transmission line, so that a function of allocating power between the main transmission line and the coupling wire line can be implemented, and multi-channel power allocation can be implemented through a plurality of times of coupling.

It may be understood that FIG. 3 shows only a simplified design of the transmit end device. In an actual application, the transmit end device may further include other necessary components, including but not limited to any quantity of transceiver antennas, processors, power dividers, couplers, power amplifiers, memories, and the like, and all terminals that can implement this application fall within the protection scope of this disclosure.

An embodiment of this disclosure further provides a transmit end device. The transmit end device may be a terminal or a circuit. The transmit end device may be configured to perform an action performed by the transmit end device in the foregoing method embodiment.

Figure 9:
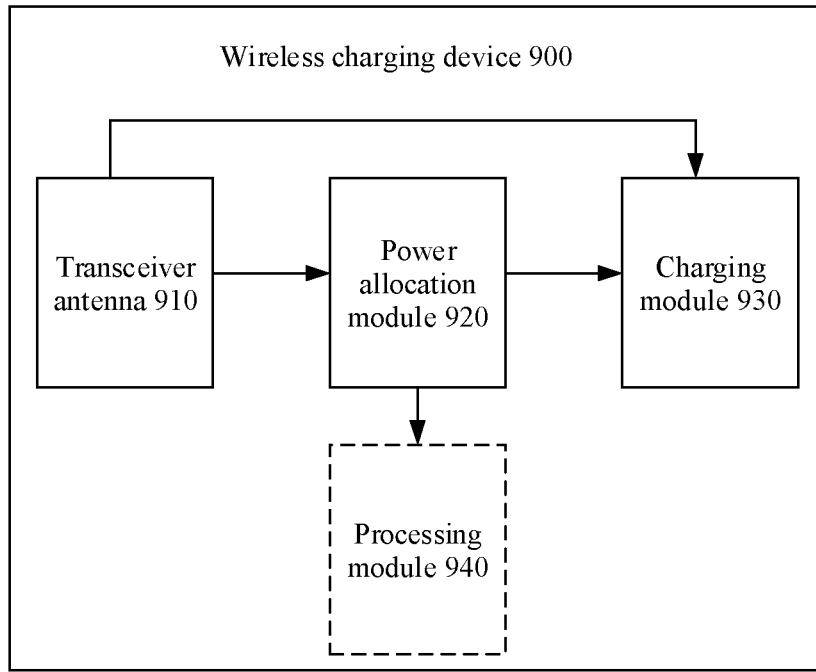
FIG. 9 is a schematic block diagram of a wireless charging device according to an embodiment of this disclosure.

FIG. 9 is a schematic block diagram of a wireless charging device 900 according to an embodiment of this disclosure.

It should be understood that the wireless charging device 900 may correspond to each wireless charging device shown in FIG. 1 or a chip in the wireless charging device, and the wireless charging device in the embodiment shown in FIG. 2 or a chip in the wireless charging device. The wireless charging device 900 may have any function of the wireless charging device in the method embodiment shown in FIG. 2. The wireless charging device 900 includes a transceiver antenna 910, a power allocation module 920, and a charging module 930.

The transceiver antenna 910 is configured to receive a third electromagnetic wave signal from a transmit end device, and forward the third electromagnetic wave signal to the power allocation module.

The power allocation module 920 is configured to split the third electromagnetic wave signal to obtain a fifth electromagnetic wave signal and a sixth electromagnetic wave signal, forward the fifth electromagnetic wave signal to the transceiver antenna, and forward the sixth electromagnetic wave signal to the charging module.

The transceiver antenna 910 is further configured to send the fifth electromagnetic wave signal to the transmit end device.

The charging module 930 is configured to perform charging based on the sixth electromagnetic wave signal.

Optionally, the transceiver antenna 910 is further configured to send a charging connection request to the transmit end device, where the charging connection request includes charging power requirement information of the wireless charging device. The transceiver antenna 910 is further configured to receive a charging connection response message from the transmit end device, where the charging connection response message indicates whether the transmit end device is capable of charging the wireless charging device.

Optionally, when the charging connection response message indicates that the transmit end device is incapable of charging the wireless charging device, the charging connection response message further includes delay duration for re-establishing a charging connection. The transceiver antenna is further configured to send the charging connection request to the transmit end device when the delay duration expires.

Optionally, the transceiver antenna 910 is further configured to receive charging broadcast information, where the charging broadcast information includes a charging capability of the transmit end device. The transceiver antenna 910 is further configured to: when the charging capability of the transmit end device meets a power requirement of the wireless charging device, send a charging connection request to the transmit end device, where the charging connection request is used to request to charge the wireless charging device.

Optionally, the transceiver antenna 910 includes a Van Atta antenna array.

Optionally, the transceiver antenna includes a plurality of antenna array elements, and each of the plurality of antenna array elements includes antennas, one or more filters, and one or more frequency mixers.

Optionally, the power allocation module is set between an antenna feedpoint of the antenna and the frequency mixer.

Optionally, when each antenna array element includes an antenna, a filter, and a frequency mixer, a frequency of a first input signal of the frequency mixer is twice a frequency of a second input signal, the second input signal is an output signal obtained after an input signal of the transceiver antenna passes through the antenna, an output signal of the frequency mixer is an input signal of the filter, and a frequency that the filter is configured to filter out is three times the frequency of the second input signal.

Optionally, when each antenna array element includes antennas, two filters, and two frequency mixers, a frequency of a first input signal of a first frequency mixer in the two frequency mixers is a sum of a preset frequency and a frequency of a second input signal, the second input signal is an output signal of the antenna, an output signal of the first frequency mixer is an input signal of a first filter in the two filters, an output signal of the first filter is a third input signal of a second frequency mixer in the two frequency mixers, a frequency of a fourth input signal of the second frequency mixer is a difference between the frequency of the second input signal and the preset frequency, an output signal of the second frequency mixer is an input signal of a second filter in the two filters, a frequency that the first filter is configured to filter out is a sum of the preset frequency and twice the frequency of the second input signal, and a frequency that the second filter is configured to filter out is a difference between the frequency of the second input signal and twice the preset frequency.

Optionally, when each antenna array element includes an antenna, one filter, and one frequency mixer, a frequency of a first input signal of the frequency mixer is twice a difference between a frequency of a second input signal and a preset frequency, the second input signal is an output signal of the antenna, and a frequency that the filter is configured to filter out is a sum of three times the frequency of the second input signal and twice the preset frequency.

Optionally, the power allocation module includes a coupler or a power divider.

It may be understood that FIG. 9 shows only a simplified design of the wireless charging device. In an actual application, the wireless charging device may further include other necessary components, including but not limited to any quantity of transceiver antennas, processors, power dividers, memories, and the like, and all terminals that can implement this application fall within the protection scope of this disclosure.

An embodiment of this disclosure further provides a wireless charging device. The wireless charging device may be a terminal or a circuit. The transmit end device may be configured to perform an action performed by the transmit end device in the foregoing method embodiment.

In this disclosure, "at least one" means one or more, and "a plurality of" means two or more. And/or describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. In addition, "at least one of the following items (pieces)" or a similar expression thereof indicates any combination of these items, including a single item (piece) or any combination of a plurality of items (pieces). For example, at least one of a, b, or c may indicate: a, b, c, a and b, a and c, b and c, or a, b, and c, where a, b, and c may be singular or plural.

It should be understood that "one embodiment" or "an embodiment" mentioned in the entire specification does not mean that particular features, structures, or characteristics related to the embodiment are included in at least one embodiment of this invention. Therefore, "in one embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in embodiments of this invention. The execution sequences of the processes should be determined according to functions and internal logic of the processes, and should not be construed as any limitation on the implementation processes of embodiments of this invention.

The terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed by various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

It should further be understood that "first", "second", and various numerical symbols in this specification are merely used for distinguishing for ease of description, and are not intended to limit the scope of embodiments of this disclosure.

It should be noted that a term "and/or" describes an association relationship between associated objects and indicates that three relationships may exist. For example, A and/or B may indicate the following cases: Only A exists, both A and B exist, and only B exists. When only A or only B exists, a quantity of A or B is not limited. In an example in which only A exists, it may be understood as that there is one or more A.

A person of ordinary skill in the art may be aware that, in combination with the examples described in embodiments disclosed in this specification, units and algorithm steps may be implemented by electronic hardware or a combination of computer software and electronic hardware. Whether a function is performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this disclosure, it should be understood that the disclosed systems, apparatuses, and methods may be implemented in other manners. For example, the foregoing described apparatus embodiments are merely examples. For example, division into the units is merely a logical function division and may be another division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objective of the solutions of embodiments.

In addition, functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in the form of a software product. The software product is stored in a storage medium, and includes several instructions for instructing a computer device (which may be a personal computer, a server, a network device, or the like) to perform all or some of the steps in the methods described in embodiments of this disclosure. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing description is merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A wireless charging method, comprising:
receiving, by a transmit end device, a first electromagnetic wave signal from a wireless charging device;

performing, by the transmit end device, power amplification on all or a part of the first electromagnetic wave signal to obtain a third electromagnetic wave signal;

sending, by the transmit end device, the third electromagnetic wave signal to the wireless charging device to charge the wireless charging device;

receiving, by the transmit end device, a fifth electromagnetic wave signal from the wireless charging device, wherein the fifth electromagnetic wave signal is obtained by the wireless charging device by splitting the third electromagnetic wave signal; and stopping, by the transmit end device, charging the wireless charging device according to a signal strength of the fifth electromagnetic wave signal.

2. The method according to claim 1, wherein the performing, by the transmit end device, power amplification on all or a part of the first electromagnetic wave signal to obtain the third electromagnetic wave signal comprises:

splitting the first electromagnetic wave signal to obtain a second electromagnetic wave signal and a fourth electromagnetic wave signal;

determining, by the transmit end device, a gain coefficient based on the fourth electromagnetic wave signal; and performing, by the transmit end device, power amplification on the second electromagnetic wave signal based on the gain coefficient to obtain the third electromagnetic wave signal.

3. The method according to claim 1, wherein the stopping, by the transmit end device, charging the wireless charging device according to a signal strength of the fifth electromagnetic wave signal comprises:

stopping, by the transmit end device, charging the wireless charging device when signal strength of the fifth electromagnetic wave signal is less than or equal to a preset value.

4. The method according to claim 1, wherein the method further comprises:

receiving, by the transmit end device, a charging connection request from the wireless charging device, wherein the charging connection request comprises charging power requirement information of the wireless charging device;

determining, by the transmit end device based on the charging power requirement information, whether the transmit end device is capable of charging the wireless charging device; and sending, by the transmit end device, a charging connection response message to the wireless charging device, wherein the charging connection response message indicates whether the transmit end device is capable of charging the wireless charging device.

5. The method according to claim 4, wherein when the charging connection response message indicates that the transmit end device is not capable of charging the wireless charging device, the charging connection response message further comprises delay duration for re-establishing a charging connection.

6. The method according to claim 1, wherein the method further comprises:

sending, by the transmit end device, charging broadcast information, wherein the charging broadcast information comprises a charging capability of the transmit end device; and receiving, by the transmit end device, a charging connection request from the wireless charging device, wherein the charging connection request is used to request to charge the wireless charging device.

7. A wireless charging method, comprising:

receiving, by a wireless charging device, a third electromagnetic wave signal from a transmit end device;

splitting, by the wireless charging device, the third electromagnetic wave signal to obtain a fifth electromagnetic wave signal and a sixth electromagnetic wave signal;

sending, by the wireless charging device, the fifth electromagnetic wave signal to the transmit end device; and performing, by the wireless charging device, charging based on the sixth electromagnetic wave signal;

wherein a signal strength of the fifth electromagnetic wave signal is used for a determination of terminating charging.

8. The method according to claim 7, wherein the method further comprises:

sending, by the wireless charging device, a charging connection request to the transmit end device, wherein the charging connection request comprises charging power requirement information of the wireless charging device; and receiving, by the wireless charging device, a charging connection response message from the transmit end device, wherein the charging connection response message indicates whether the transmit end device is capable of charging the wireless charging device.

9. The method according to claim 8, wherein when the charging connection response message indicates that the transmit end device is not capable of charging the wireless charging device, the charging connection response message further comprises delay duration for re-establishing a charging connection; and the method further comprises:

re-sending, by the wireless charging device, the charging connection request to the transmit end device when the delay duration expires.

10. The method according to claim 7, wherein the method further comprises:

receiving, by the wireless charging device, charging broadcast information, wherein the charging broadcast information comprises a charging capability of the transmit end device; and when the charging capability of the transmit end device meets a power requirement of the wireless charging device, sending, by the wireless charging device, a charging connection request to the transmit end device, wherein the charging connection request is used to request to charge the wireless charging device.

11. A transmit end device for wireless charging, comprising:

a transceiver antenna; and a power amplification module; wherein:

the transceiver antenna configured to receive a first electromagnetic wave signal from a wireless charging device and forward all or a part of the first electromagnetic wave signal to the power amplification module;

the power amplification module is configured to perform power amplification on all or the part of the first electromagnetic wave signal to obtain a third electromagnetic wave signal, and send the third electromagnetic wave signal to the transceiver antenna, wherein the transceiver antenna is further configured to:

send the third electromagnetic wave signal to the wireless charging device, wherein the third electromagnetic wave signal is used to charge the wireless charging device;

receive a fifth electromagnetic wave signal from the wireless charging device, wherein the fifth electromagnetic wave signal is obtained by the wireless charging device by splitting the third electromagnetic wave signal; and the transmit end device further comprises a processing module, wherein the processing module is configured to stop charging the wireless charging device according to a signal strength of the fifth electromagnetic wave signal.

12. The transmit end device according to claim 11, wherein the transmit end device further comprises a power allocation module and a gain control module, wherein the power allocation module is configured to split the first electromagnetic wave signal to obtain a second electromagnetic wave signal and a fourth electromagnetic wave signal, and send the fourth electromagnetic wave signal to the gain control module;

the gain control module is configured to determine a gain coefficient based on the fourth electromagnetic wave signal, and send the gain coefficient to the power amplification module; and the power amplification module is specifically configured to perform power amplification on the second electromagnetic wave signal based on the gain coefficient to obtain the third electromagnetic wave signal, and send the third electromagnetic wave signal to the transceiver antenna.

13. The transmit end device according to claim 11, wherein the processing module is configured to stop charging the wireless charging device when signal strength of the fifth electromagnetic wave signal is less than or equal to a preset value.

14. The transmit end device according to claim 11, wherein the transceiver antenna is further configured to receive a charging connection request from the wireless charging device, wherein the charging connection request comprises charging power requirement information of the wireless charging device;

the transmit end device further comprises the processing module, wherein the processing module is configured to determine, based on the charging power requirement information, whether the transmit end device is capable of charging the wireless charging device; and the transceiver antenna is further configured to send a charging connection response message to the wireless charging device, wherein the charging connection response message indicates whether the transmit end device is capable of charging the wireless charging device.

15. The transmit end device according to claim 14, wherein when the charging connection response message indicates that the transmit end device is not capable of charging the wireless charging device, the charging connection response message further comprises delay duration for re-establishing a charging connection.

16. The transmit end device according to claim 11, wherein the transceiver antenna is further configured to send charging broadcast information, wherein the charging broadcast information comprises a charging capability of the transmit end device; and the transceiver antenna is further configured to receive a charging connection request from the wireless charging device, wherein the charging connection request is used to request to charge the wireless charging device.

17. A wireless charging device, comprising:
a transceiver antenna;
a power allocation module; and
a charging module, wherein:

the transceiver antenna is configured to receive a third electromagnetic wave signal from a transmit end device and forward the third electromagnetic wave signal to the power allocation module;

the power allocation module is configured to split the third electromagnetic wave signal to obtain a fifth electromagnetic wave signal and a sixth electromagnetic wave signal, forward the fifth electromagnetic wave signal to the transceiver antenna, and forward the sixth electromagnetic wave signal to the charging module, wherein:

the transceiver antenna is further configured to send the fifth electromagnetic wave signal to the transmit end device; and the charging module is configured to perform charging based on the sixth electromagnetic wave signal;

wherein a signal strength of the fifth electromagnetic wave signal is used for a determination of terminating charging.

18. The wireless charging device according to claim 17, wherein the transceiver antenna is further configured to send a charging connection request to the transmit end device, wherein the charging connection request comprises charging power requirement information of the wireless charging device; and the transceiver antenna is further configured to receive a charging connection response message from the transmit end device, wherein the charging connection response message indicates whether the transmit end device is capable of charging the wireless charging device.

19. The wireless charging device according to claim 18, wherein when the charging connection response message indicates that the transmit end device is not capable of charging the wireless charging device, the charging connection response message further comprises delay duration for re-establishing a charging connection; and when the delay duration expires, the transceiver antenna is further configured to re-send the charging connection request to the transmit end device.

20. A wireless charging system, comprising:
a transmit end device; and
a wireless charging device, wherein:

the transmit end device is configured to:

receive a first electromagnetic wave signal from the wireless charging device;

perform power amplification on all or a part of the first electromagnetic wave signal to obtain a third electromagnetic wave signal;

send the third electromagnetic wave signal to the wireless charging device;

receive a fifth electromagnetic wave signal from the wireless charging device, wherein the fifth electromagnetic wave signal is obtained by the wireless charging device by splitting the third electromagnetic wave signal; and the wireless charging device is configured to:

split the third electromagnetic wave signal to obtain a fifth electromagnetic wave signal and a sixth electromagnetic wave signal;

send the fifth electromagnetic wave signal to the transmit end device;

perform charging based on the sixth electromagnetic wave signal; and the transmit end device is further configured to stop charging the wireless charging device according to a signal strength of the fifth electromagnetic wave signal.

* * * * *